March 24, 1964 V. H. STEEL 3,126,003
METHOD FOR CREATING ENERGY CARRIER STATES
OF OXYGEN IN INSPIRED AIR
Filed July 2, 1962 2 Sheets-Sheet 1
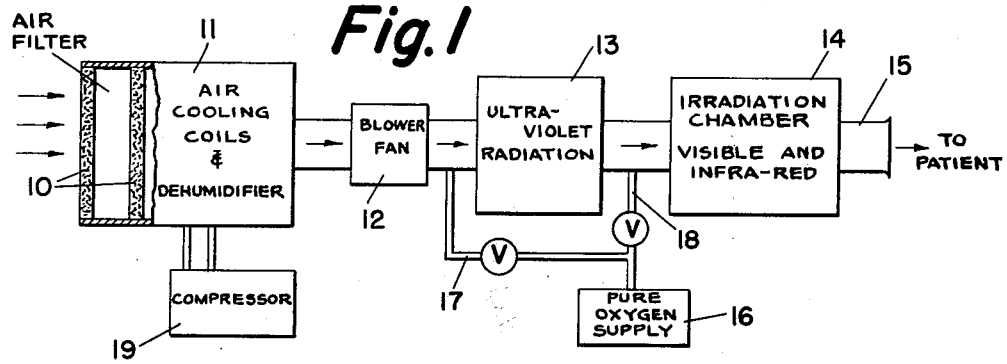
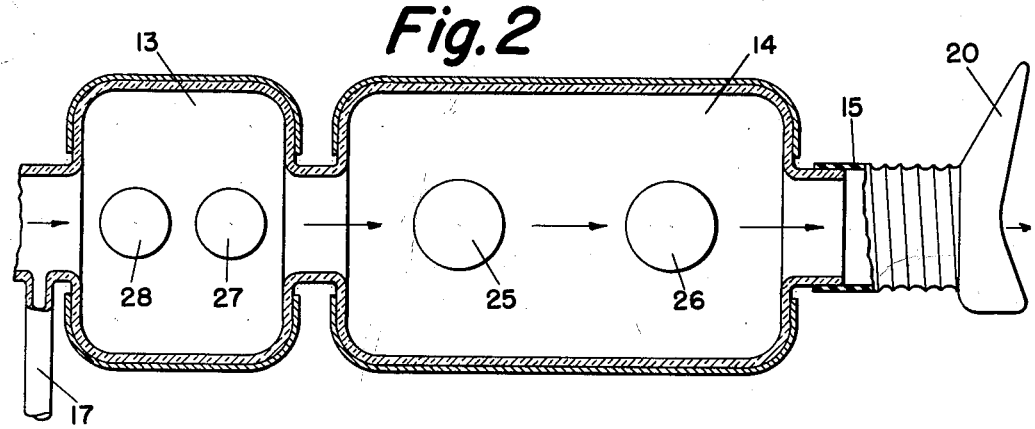
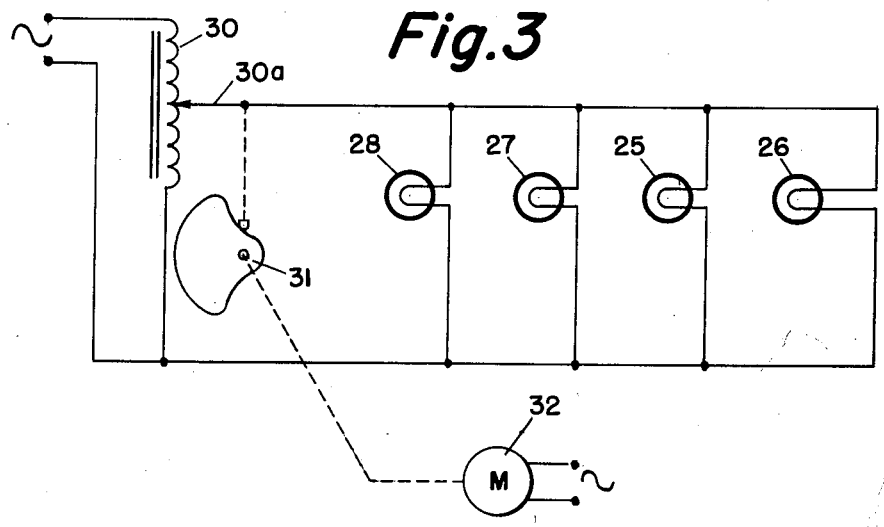

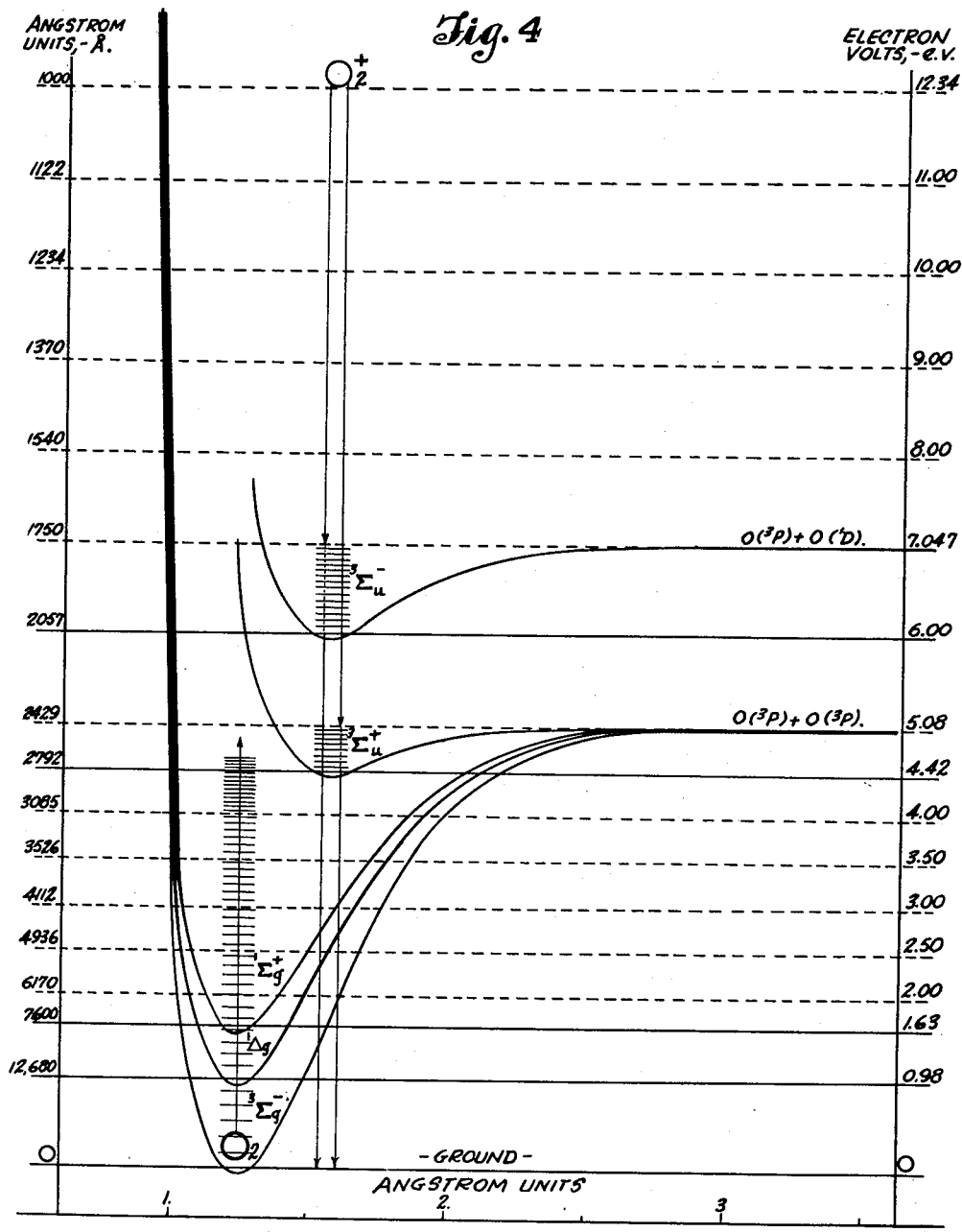

United States Patent Office 3,126,003
Patented Mar. 24, 1964

3,126,003
METHOD FOR CREATING ENERGY CARRIER STATES OF OXYGEN IN INSPIRED AIR
Van H. Steel, 440 Walnut St., San Carlos, Calif.
Filed July 2, 1962, Ser. No. 208,183
5 Claims. (Cl. 128—172)

This invention relates to a method of processing or treating of oxygen and to the utilization of energy carrier states of oxygen of inspired air by human beings and animals for the correction or treatment of existing pathological conditions in said human beings or animals. Furthermore, the invention relates to apparatus useful for the building up to an energetic defense against the development of pathological conditions or dysfunctions that are the result of bacterial or virus invasions of said organisms.

This application is a continuation-in-part of my parent application Serial No. 513,341, filed June 6, 1955, now Patent No. 2,920,622, for "Method and Apparatus for Creating Energy Carrier States of Oxygen in Inspired Air" and it is also a continuation-in-part of my application Serial No. 850,576, filed November 3, 1959, and abandoned in favor of the present application. In my said parent application there were disclosed methods and apparatus for passing a stream of air through a first treating zone. In that zone, ionizing potentials are applied to ionize oxygen molecules, but under conditions producing insubstantial ionization of nitrogen. In a second treating zone there is applied to the stream of air a band of radiant energy extending between wavelengths of about 3,000 Angstrom units and about 13,000 Angstrom units, this band of radiant energy including visible light and the infrared portion of the spectrum. As fully explained in said parent application, the two steps heretofore described greatly increase in number the oxygen metastables within an ionized stream. The end result is the production of a stream of air which therapeutically is superior to either the ionized stream alone or to an irradiated stream taken alone.

In the present application, the same terminology will be utilized as in my Patent 2,920,622. More particularly, oxygen metastables may be defined as oxygen atoms or molecules to which energy has been added to move an electron from an inner orbit to an outer orbit where it remains for a matter of seconds. The life span of these oxygen metastables or energy-carriers permits them to be inspired when the recipient is seated close to the point of their formation.

Thus, when the $$(^3\Sigma_u{}^+)$$

metastable, for example, gives up its combined electronic and vibrational energy in one jump as it collides with water molecules, it will drop to a ground state, and the water molecules will radiate this energy in ultraviolet wavelengths. This radiation released by the water molecules will be of different wavelengths, and likely in a continuous spectrum. The length of these ultraviolet rays released will be governed largely by the specific vibrational energy level from which the metastable drops when it gives rise to said ultraviolet wavelengths of emission.

I have explained in my Patent 2,920,622 as well as in my prior patents, Nos. 2,334,338 and 2,415,659, that the ionizing step must be carefully performed and under such conditions as will produce insubstantial ionization of nitrogen.

In carrying out the present invention in one form thereof, I have found that there may be utilized irradiation of treated air with ultraviolet light in a first treating zone, followed by irradiation of that stream of air with high intensity radiation including the range of visible light and near infrared light. By reason of the fact that ultraviolet radiation is suitable for the first step in the process, the intensity of its radiation at wavelengths below the dissociation potential of molecular oxygen, i.e., about 2430 Angstrom units, may be increased to relatively high levels without the danger of producing potentially deleterious by-products in the air.

Accordingly, with relatively high intensity ultraviolet irradiation of oxygen, high energy level $$(^3\Sigma_u{}^+)$$

oxygen metastables may be produced in substantial numbers. These high energy level metastables will then be supplemented by the $$(^1\Sigma_g{}^+)$$

intermediate energy level oxygen metastables created by irradiation with visible light for the most part as produced by step two. Also in step two, the lower energy level oxygen metatables, i.e., the $$(^1\Delta_g)$$

and the higher vibrational energy levels of the ground state of molecular oxygen $$(^3\Sigma_g{}^-)$$

will be created by infrared irradiation. Thus by these two or three irradiation steps of molecular oxygen, the whole gamut of high energy, intermediate energy and low energy metastable oxygen molecules can be created and properly balanced for inspiratory purposes.

Inasmuch as the oxygen metastables produced in accordance with the present invention result from the application of radiant energy of adequately high intensity to a stream of filtered and low humidity or dehumidified air, it will be recognized that the steps outlined above need not be performed in any given sequence. In fact, the sources may be arranged to apply the required bands of radiant energy at the specified intensities to the stream of air passing through a single treating zone from which it is immediately inspired for therapeutic purposes.

For further objects and advantages of the invention and for a description of apparatus by means of which the present method may be carried out, reference is to be had to the accompanying drawing, in which:

FIG. 1 diagrammatically illustrates a system embodying the invention;

FIG. 2 illustrates in more detail apparatus embodied in the system of FIG. 1;

FIG. 3 illustrates a means for varying the intensity of radiation from the several sources; and FIG. 4 is a graph that is explanatory of the energy states and spectra of diatomic molecules of oxygen, the vibrational energy levels being schematically represented.

Referring now to FIG. 1, there is preferably utilized in conjunction with my invention an air filter 10 through which air is passed by means of a blower fan 12. During its passage through the chamber 11, it contacts cooling coils to cool and dehumidify the air. The filtered and dehumidified air is then transported or forced by the blower fan 12 through the first treating chamber 13. This chamber, about twelve inches in diameter, includes ultraviolet radiating means for producing in the treated air high intensity ultraviolet radiation. If desired, pure oxygen may be introduced as from a supply source 16 by way of valve 17 into the first treating zone 13. Alternatively and concurrently oxygen may also be introduced into the inlet to the second treating zone 14. The stream of air, either concurrently with or after being subjected to high intensity radiation in the treating zone 13, is then subjected to high intensity radiation in the treating zone 14, this radiation being that including the visible light and the infrared. The air now with its metastable oxygen content substantially increased is delivered to a transfer means 15 for inspiration by the patient.

In FIG. 2 there has been illustrated an apparatus suited for practice of the invention of a type quite similar to that utilized in FIG. 6 of my parent application. A breathing mask or inhalation-directing means 20 is shown connected to the outlet 15, which in turn is connected to the second treating zone 14. This treating zone 14 includes lamps 25 and 26 for producing high intensity radiation in the range of visible light and including infrared. In the preceding or first treating zone 13, there are provided high intensity sources of ultraviolet radiation, such for example, as mercury-vapor quartz lamps 27 and 28, those skilled in the art being familiar with the sources of ultraviolet light.

Though the zones 13 and 14 have been shown as partly separated one from the other for separate admission of oxygen thereto as shown in FIG. 1, it will be seen that the degree of separation depends upon the diameter of the opening between the zones. In practice, treating zones 13 and 14 may be formed as one, that is, with a uniform cross-sectional area from the entrance to zone 13 to the exit from zone 14. The placement of the sources may be interchanged. Thus, the location of the source 25 may be at the location of source 27 or 28 and one of the latter at the location of source 25. Moreover, the sources 25—28 may be disposed circumferentially of a single treating chamber or circumferentially of two or more treating zones of the kind shown in FIG. 2.

As to wavelengths and intensity in the treating zone for the metastables $$(^3\Sigma_u^+)$$

of higher energy level, I prefer to utilize wavelengths between about 2500 Angstrom units and about 3000 Angstrom units. A high energy mercury lamp produces an adequately high intensity in the 2537 Angstrom unit line, and in the vital band of from 2600 Angstrom units to 2950 Angstrom units produces high germicidal effectiveness. An ultraviolet source that will emit wavelengths of this intensity or higher which coincide with known molecular oxygen absorption frequencies or lines essential to the formation of the $$(^3\Sigma_u^+)$$

metastable state, will be a suitable source of radiation for this first treating zone, as for example, five to ten ampere lamps of the carbon arc type.

As to wavelengths and intensity in the treating zone for metastables of intermediate energy level, these would be similar to those used in my issued Patent 2,920,622 for near-infrared and visible light, i.e., between about 3000 to 4000 Angstrom units and about 13,000 Angstrom units. Since the flow rate is relatively constant, the volume of the gas per unit time through zones 13 and 14 is constant in my equipment. The intensity of the wavelengths for the formation of metastables of intermediate energy and low energy levels must be balanced against the radiation intensities utilized in the formation of metastables of high levels of energy in order to obtain optimal therapeutic end-effects. I prefer intensities for the formation of intermediate and low energy metastables of the order of 30,000 foot candles to 600,000 foot candles and above. Allowance must also be made here for the potential reflective properties of the irradiation chamber. Photons will tend to bounce around in an irradiation chamber with transmissive walls and highly reflective outer surfaces. Under these conditions, additional oxygen metastables may readily be formed.

Still further to increase the usefulness of the metastable-active oxygen, the concentration of metastables is periodically varied. By thus varying the concentration, nerve ends seem to be stimulated in their response to the radiant energy released as the metastables lose energy. This time-varying concentration may be achieved in many ways. For example, the source of supply for the irradiating means 25—28 may include a variable transformer 30 with a movable tap 30a for periodically increasing and decreasing the intensity of the radiation developed in one or both of the two treating zones 13 and 14. As shown, a cam 31 moves contact 30a alternately to increase and to decrease the voltage applied to the radiation sources 25—28, the cam 31 being driven by a motor 32. Where four or more lamps per zone are provided, two may be operated at normal voltage levels for the high intensity radiation. The remaining two lamps, such as lamps 25, 26 of zone 14 and lamps 27, 28 of zone 13, may be connected first in series and then in parallel, thus to introduce the varying metastable content of the activated oxygen delivered from zone 14.

For a further understanding of the present invention and the background theory upon which it is based, reference is to be had to the schematic energy chart comprising FIG. 4. In this graphic view, the vertical scale at the right-hand side expresses the energy levels of oxygen in terms of electron volts. Similarly, the vertical scale at the left-hand side expresses the same energy values in wavelengths emitted from the oxygen molecule, and the horizontal line across the bottom expresses the varying distances between the atoms of an oxygen molecule in terms of Angstrom units. In this view, I have shown five energy curves for molecular oxygen. Four of these are seen to converge at the right at 5.08 electron volts or 2430 Angstrom units. This represents the first dissociation potential for molecular oxygen, at which energy level the molecule dissociates to form two normal $^3P$ atoms. The second dissociation potential, as shown by the fifth curve, is at 7.047 volts or 1750 Angstrom units, at which level the molecule dissociates to form a normal $^3P$ atom and an excited $^1D$ metastable atom.

For a more detailed presentation of how there is achieved the electronic transition from the ground state to the metastable state of molecular oxygen, reference is to be had to my aforesaid Patent 2,920,622, particularly columns 3 to 6, where the background theory has been set forth at considerable length in connection with a graph identical with present FIG. 4.

Having now explained the principles of my invention, it will be understood that modifications may be made within the scope of the appended claims.

What is claimed is:

1. The method of generating oxygen metastables of three differing energy levels in a filtered and low humidity or dehumidified stream of air for respiratory purposes, which comprises applying to said stream of air high intensity radiation of wavelengths from about 2500 Angstrom units to about 3000 Angstrom units within the band of the ultraviolet for producing high energy oxygen metastables within said stream, applying to said stream of air a band of high intensity radiant energy with wavelengths coextensive with those of visible light for producing oxygen metastables having intermediate energy levels, and concurrently applying to said stream of air a band of high intensity radiant energy corresponding with the infrared for producing oxygen metastables having lower energy levels as compared with said high energy and intermediate energy metastables, the intensity of said radiant energy including said visible light and said infrared respectively being of the order of 30,000 foot candles and above and including substantially all wavelengths between about 3,000 Angstrom units and about 13,000 Angstrom units.

2. The method of claim 1 in which the rates of generation of oxygen metastables are alternatively increased and decreased for delivery with said stream of air oxygen metastables which vary in quantity first in one direction and then in the opposite direction.

3. The method of treating for respiratory purposes a filtered and dehumidified stream of air, which comprises passing said stream of air through a first treating zone, in said treating zone applying to said stream of air high intensity radiation within the band of the ultraviolet for producing high energy oxygen metastables within said stream, passing said stream of air from said first treating zone through a second treating zone, in said second treating zone applying a band of high intensity radiant energy coextensive with visible light for producing oxygen metastables having an intermediate energy level, and concurrently applying to said stream of air a band of high intensity radiant energy corresponding with the infrared for producing oxygen metastables having a lower energy level as compared with said high energy and intermediate energy metastables, the intensity of said radiation within said second zone being of the order of 30,000 foot candles and above and the band of radiant energy applied to said stream of air in said second zone including substantially all wavelengths between about 3,000 Angstrom units and 13,000 Angstrom units.

4. The method of claim 3 in which said quantity of metastables is alternately increased and decreased by alternately increasing and decreasing the intensity of radiation in at least one of said treating zones.

5. The method of claim 3 in which said quantity of metastables is periodically changed by periodic variation in the intensity of radiation of said second zone.

References Cited in the file of this patent

UNITED STATES PATENTS

| | | |
|---|---|---|
| 2,213,403 | Miller | Sept. 3, 1940 |
| 2,681,061 | Modell | June 15, 1954 |